(12) United States Patent
Leech et al.

(10) Patent No.: US 9,226,523 B2
(45) Date of Patent: Jan. 5, 2016

(54) METHOD AND MEANS FOR EXTENDING THE SHELF LIFE OF FOOD PRODUCTS

(71) Applicants: Leslie D. Leech, Fremont, NE (US); Shawn M. Palandri, Fremont, NE (US)

(72) Inventors: Leslie D. Leech, Fremont, NE (US); Shawn M. Palandri, Fremont, NE (US)

(73) Assignee: FREMONT BEEF COMPANY, Fremont, NE (US)

( * ) Notice: Subject to any disclaimer, the term of this patent is extended or adjusted under 35 U.S.C. 154(b) by 36 days.

(21) Appl. No.: 13/946,094

(22) Filed: Jul. 19, 2013

(65) Prior Publication Data

US 2015/0024096 A1 Jan. 22, 2015

(51) Int. Cl.
*A21D 6/00* (2006.01)
*A23L 3/28* (2006.01)
*A23L 3/3445* (2006.01)
*A23B 4/015* (2006.01)
*A23B 4/24* (2006.01)

(52) U.S. Cl.
CPC . *A23L 3/28* (2013.01); *A23B 4/015* (2013.01); *A23B 4/24* (2013.01); *A23L 3/3445* (2013.01); *A23V 2002/00* (2013.01)

(58) Field of Classification Search
CPC .......................................................... A23L 3/28
USPC .................................... 426/248, 520; 99/451
See application file for complete search history.

(56) References Cited

U.S. PATENT DOCUMENTS

| 1,985,238 | A | * | 12/1934 | Brogden | 426/295 |
| 3,220,333 | A | * | 11/1965 | Davison | 99/475 |
| 3,927,588 | A | * | 12/1975 | Laderach | 83/15 |
| 5,227,184 | A | * | 7/1993 | Hurst | 426/312 |
| 6,558,724 | B1 | * | 5/2003 | Caridis et al. | 426/438 |
| 2007/0212457 | A1 | * | 9/2007 | Turatti | 426/237 |

* cited by examiner

*Primary Examiner* — Erik Kashnikow
*Assistant Examiner* — Preston Smith
(74) *Attorney, Agent, or Firm* — Dennis L. Thomte; Thomte Patent Law Office LLC

(57) ABSTRACT

A method and means is provided for extending the shelf life of a food product by successively subjecting the food product to UV germicidal irradiation and an ozone/water or ozone/air treatment. The UV unit and the ozone unit may be reversed so that the food product is first treated with the ozone and then subjected to the UV germicidal irradiation treatment.

6 Claims, 7 Drawing Sheets

METHOD AND MEANS FOR EXTENDING THE SHELF LIFE OF FOOD PRODUCTS

BACKGROUND OF THE INVENTION

1. Field of the Invention

This invention relates to a method and means for extending the shelf life of food products such as beef, pork, poultry, sea foods, etc. More particularly, the invention relates to the food product being subjected to ultraviolet germicidal irradiation and also being subjected to an oxidizing agent such as ozone.

2. Description of the Related Art

The prior art is replete with devices and methods for subjecting food products to ultraviolet irradiation (UV) to reduce the amount of bacteria on the food products to extend the shelf life thereof. The prior art is also replete with devices and methods for subjecting food products to an oxidizing agent such as ozone to reduce the amount of bacteria on the food product to extend the shelf life thereof. To the best of Applicants' knowledge, no one has previously provided a method and means for extending the shelf life of food products by subjecting the food product to UV germicidal irradiation and then subjecting the food product to an oxidizing agent such as ozone or vice versa.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In one embodiment, the method for extending the shelf life of a food product comprises the steps of:
  a. providing a conveyor having an infeed end and a discharge end;
  b. positioning a food product on the conveyor;
  c. providing a first housing through which the conveyor passes;
  d. subjecting the food product on the conveyor to UV germicidal irradiation as the conveyor moves the food product through the first housing;
  e. providing a second housing through which the conveyor passes after it passes through the first housing;
  f. subjecting the food product on the conveyor to an oxidizing agent such as ozone as the conveyor moves the food product through the second housing.

In the embodiment just described, the product could be first subjected to the oxidizing agent and then subjected to the UV germicidal irradiation.

The means for extending the shelf life of a food product comprises a first housing having an infeed and a discharge end. A UV germicidal irradiation system is provided in the first housing. A second housing is spaced from the first housing and has an infeed and a discharge end. An oxidizing system is provided in the second housing. A conveyor is also provided which is configured to have the food product positioned thereon. The conveyor extends through the first and second housings whereby the food product is successively subjected to UV germicidal irradiation and an oxidizing agent to reduce the amount of bacteria on the food product.

The means just described may also be reversed in that the first housing could have the oxidizing system therein and the second housing could have the UV germicidal irradiation system therein.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
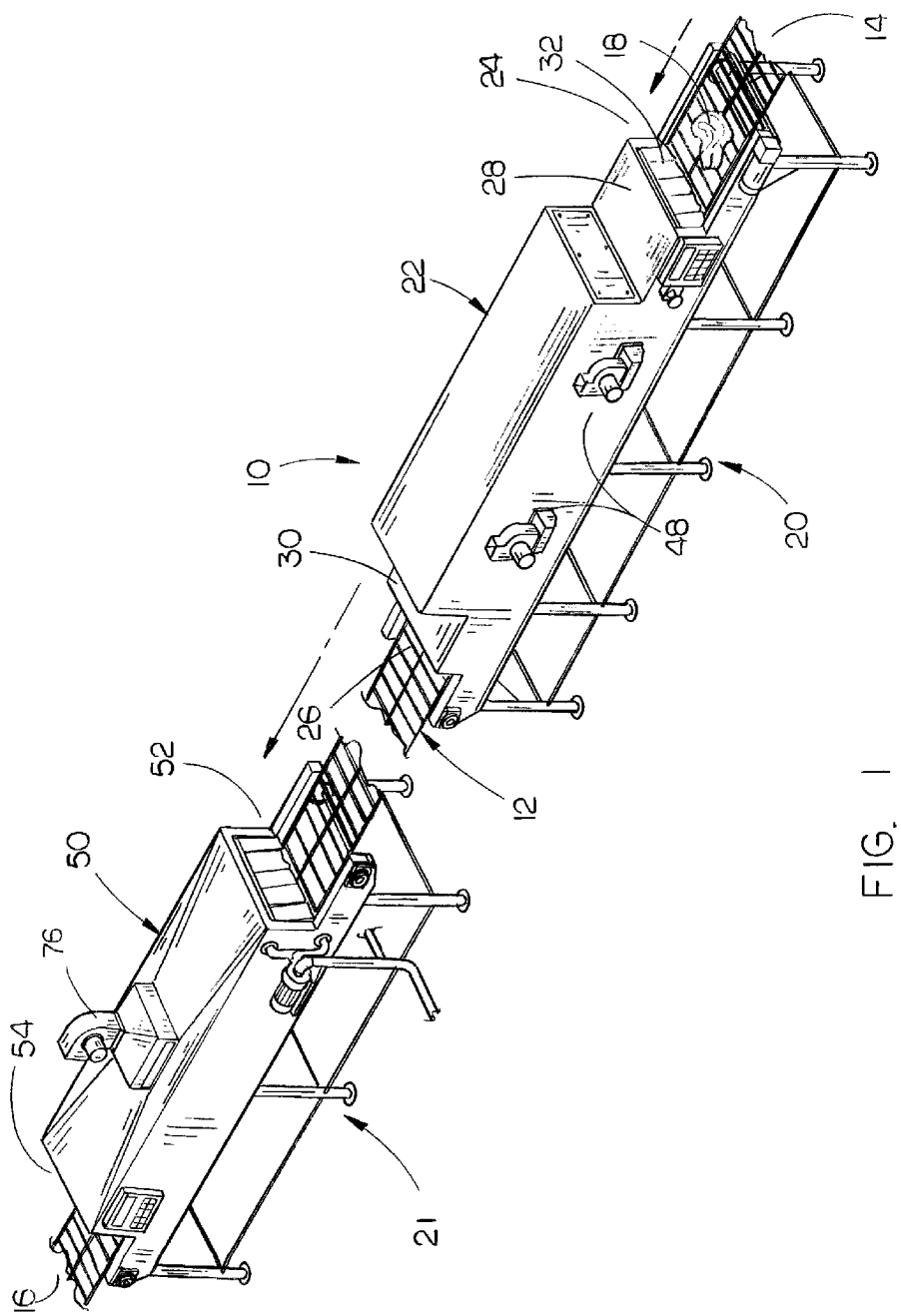
FIG. 1 is a partial perspective view of the structure of this invention for extending the shelf life of food products.
Figure 2:
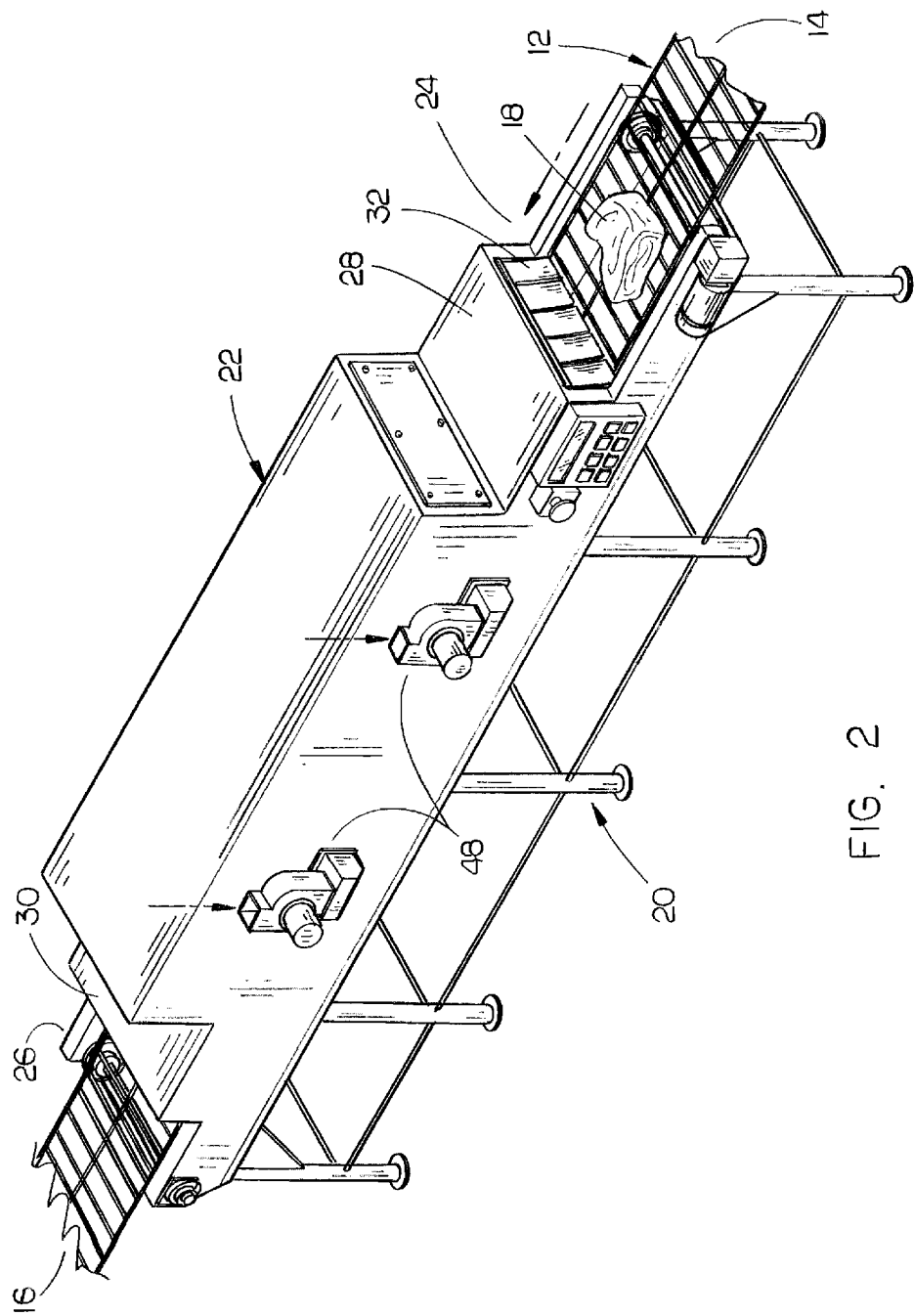
FIG. 2 is a perspective view of the first housing of this invention which includes the UV germicidal irradiation system therein.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The physical structure of this invention for extending the shelf life of food products by reducing the bacteria on the food product is referred to generally by the reference numeral 10. The numeral 12 refers to an elongated link-type conveyor having an infeed end 14 and a discharge end 16. Conveyor 12 is driven in conventional fashion. The infeed end 14 of conveyor 12 is in communication with a conventional mechanism for positioning food products 18 thereon. Conveyor 12 is supported on support frame 20 and support frame 21. Support frames 20 and 21 may be individually free-standing or may be connected together.

The numeral 22 refers to a first housing or enclosure which is supported upon the support frame 20 and which has an infeed end 24 and a discharge end 26. Housing 22 includes a small housing member 28 at its infeed end and a small housing member 30 at its discharge end. A plurality of flexible closure flaps 32 are provided at the infeed end of housing member 28 and a plurality of flexible closure flaps 34 are provided at the discharge end of housing member 28. A plurality of flexible closure flaps 36 are provided at the discharge end of housing member 30 and a plurality of flexible closure flaps 38 are provided at the infeed end of housing member 30.

Figure 3:
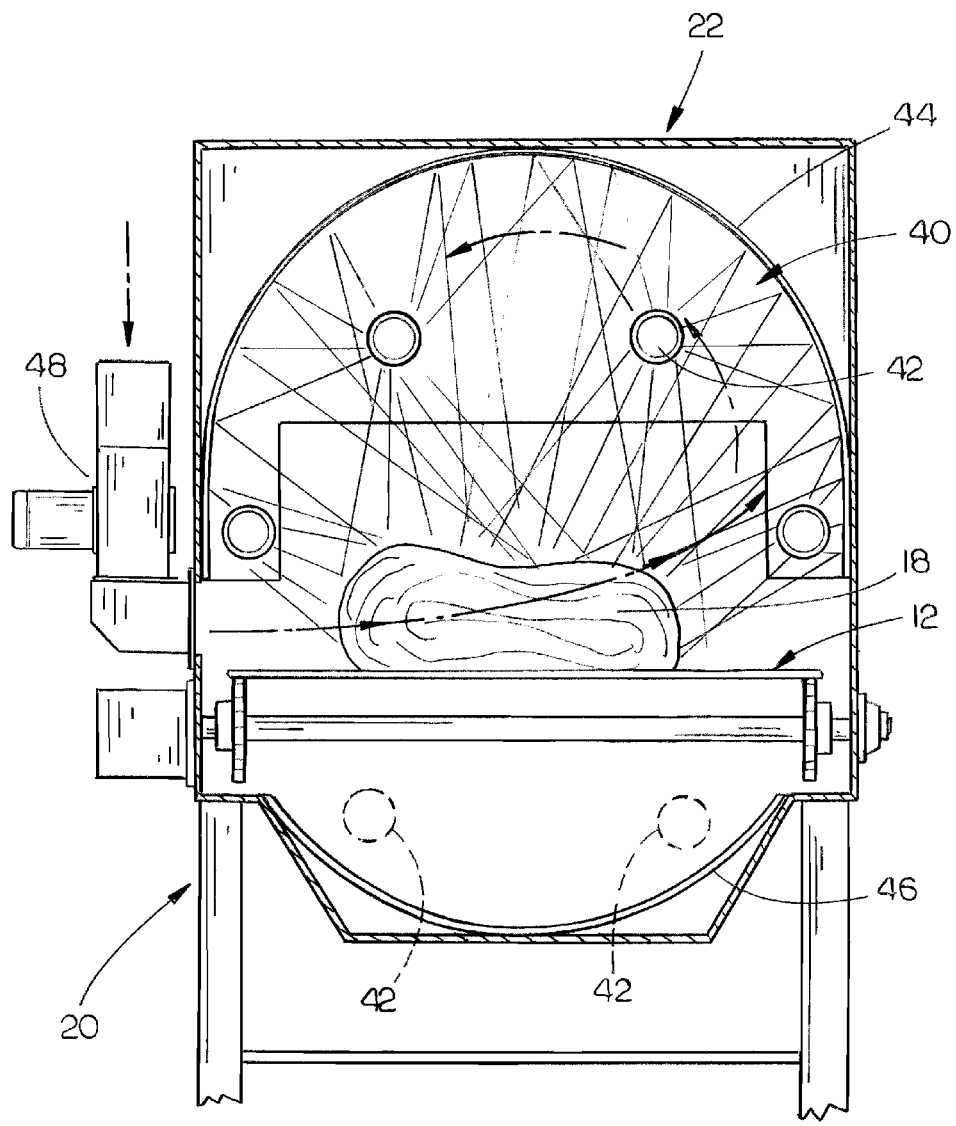
FIG. 3 is a partial sectional view of the housing of FIG. 2 which illustrates the UV germicidal irradiation system subjecting all sides of the food product to UV rays.
Figure 4:
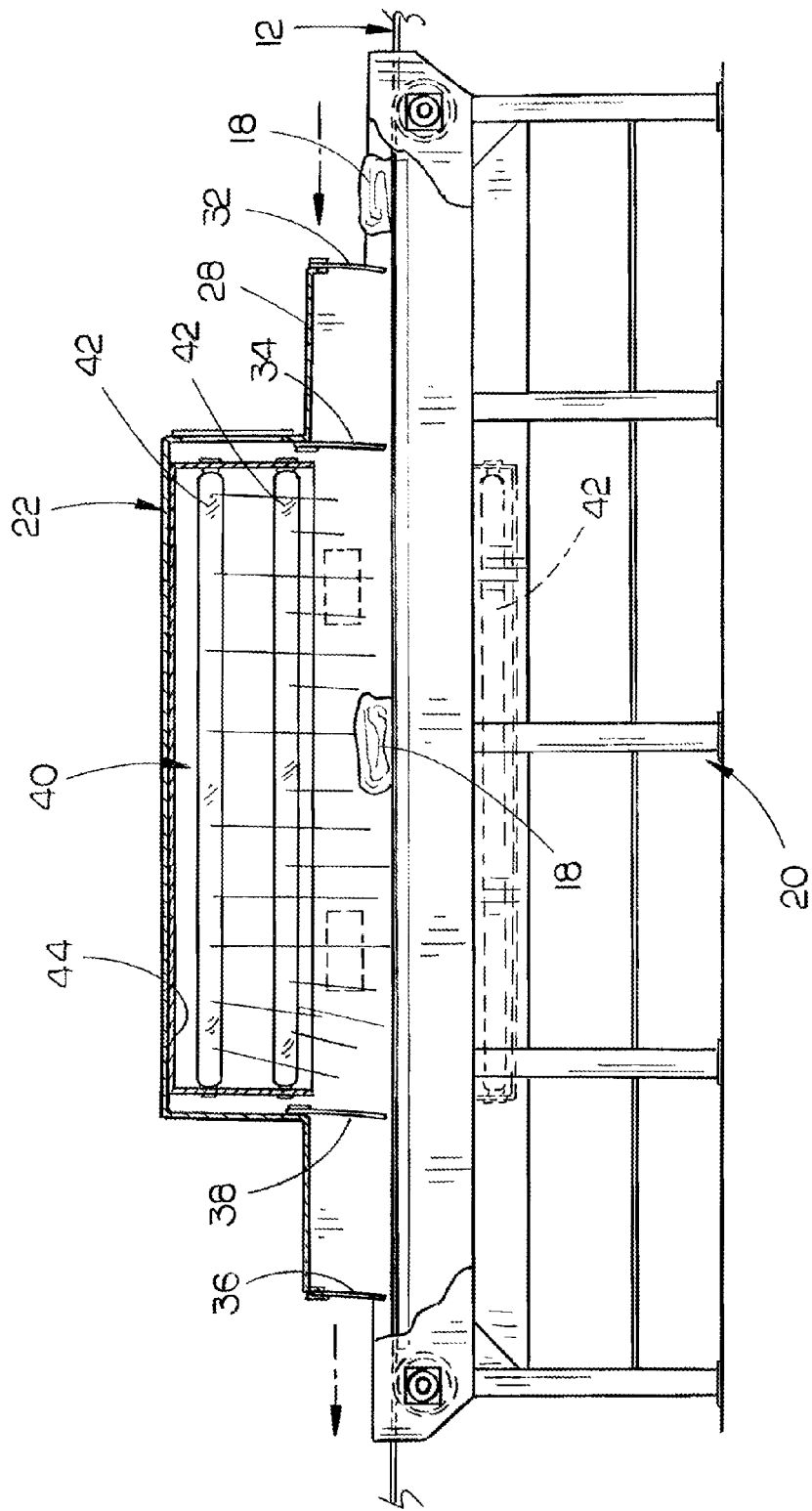
FIG. 4 is a partial sectional view of the housing of FIG. 2.
Figure 5:
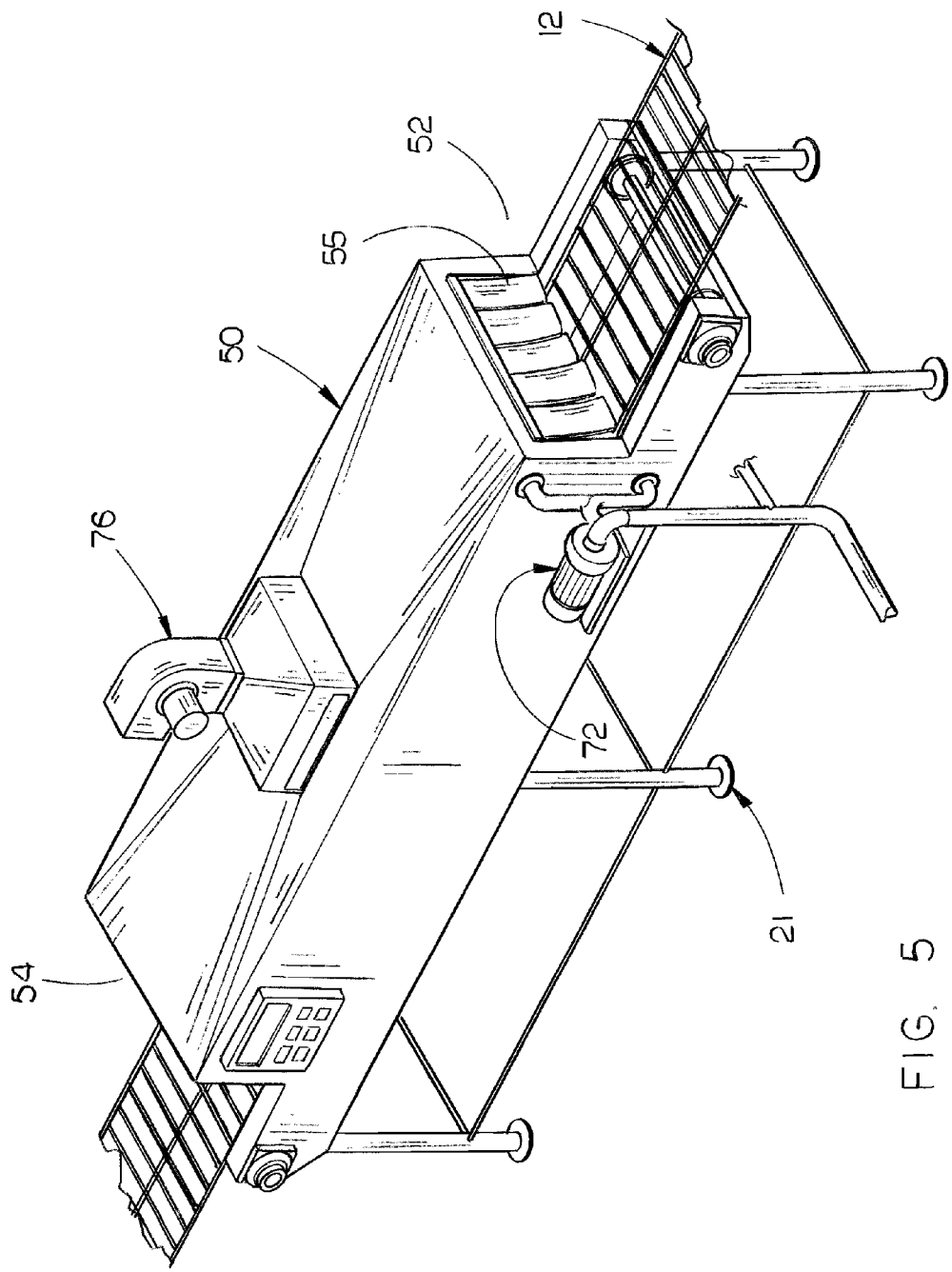
FIG. 5 is a perspective view of the second housing of this invention which includes the oxidizing system for spraying an oxidizing agent onto the food product passing therethrough.

The numeral 40 refers to an ultraviolet (UV) germicidal irradiation unit or system positioned within housing 22 which includes a plurality of spaced-apart low pressure amalgam lamps 42 which preferably produce a focused 254 nm UVC output. The lamps or tubes 42 extend longitudinally in the housing 22 in a spaced-apart manner as seen in FIG. 4. A plurality of the lamps 42 are positioned within a semi-circular or parabolic-shaped reflector hood 44 so that the UV rays from the lamps 42 will be reflected therefrom in different directions so as to be directed onto different portions of the upper portion and the sides of the food product 18. Preferably, some of the lamps 42 are positioned below the conveyor 12 as seen in FIG. 3 so as to direct UV rays toward the underside of the food product as seen in FIG. 3. Preferably, a semi-circular reflector or parabolic hood 46 is positioned below the lower lamps 42 so as to reflect UV rays from the lower lamps 42 upwardly onto the underside of the food product 18. At least one and preferably two cooling blowers 48 are mounted on the housing 22 to blow cooling air into the housing 22 to maintain a precise temperature within housing 22 and dissipate heat which is generated by the UV lamps 42.

Figure 6:
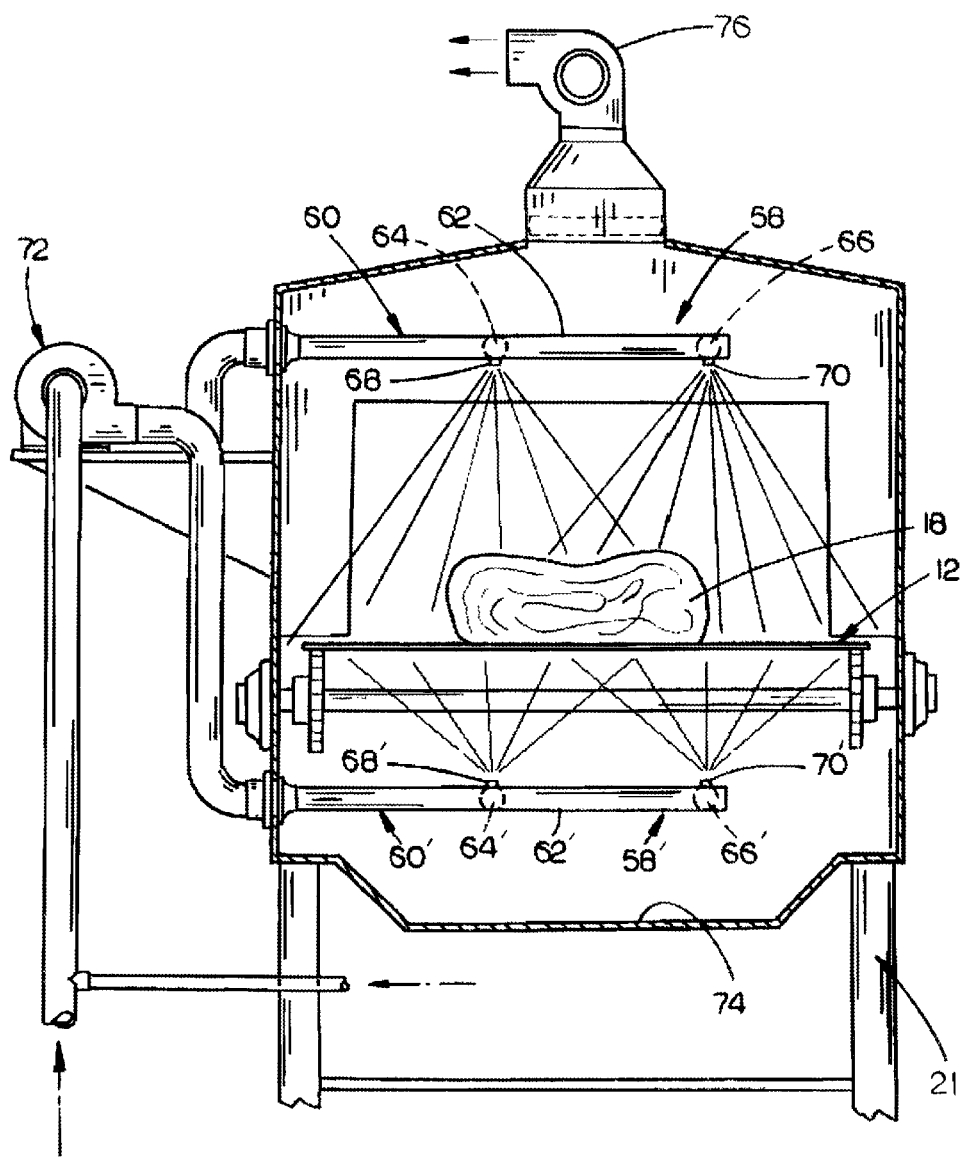
FIG. 6 is a partial sectional view of the second housing and the oxidizing system, wherein all sides of the food product are subjected to an oxidizing agent.
Figure 7:
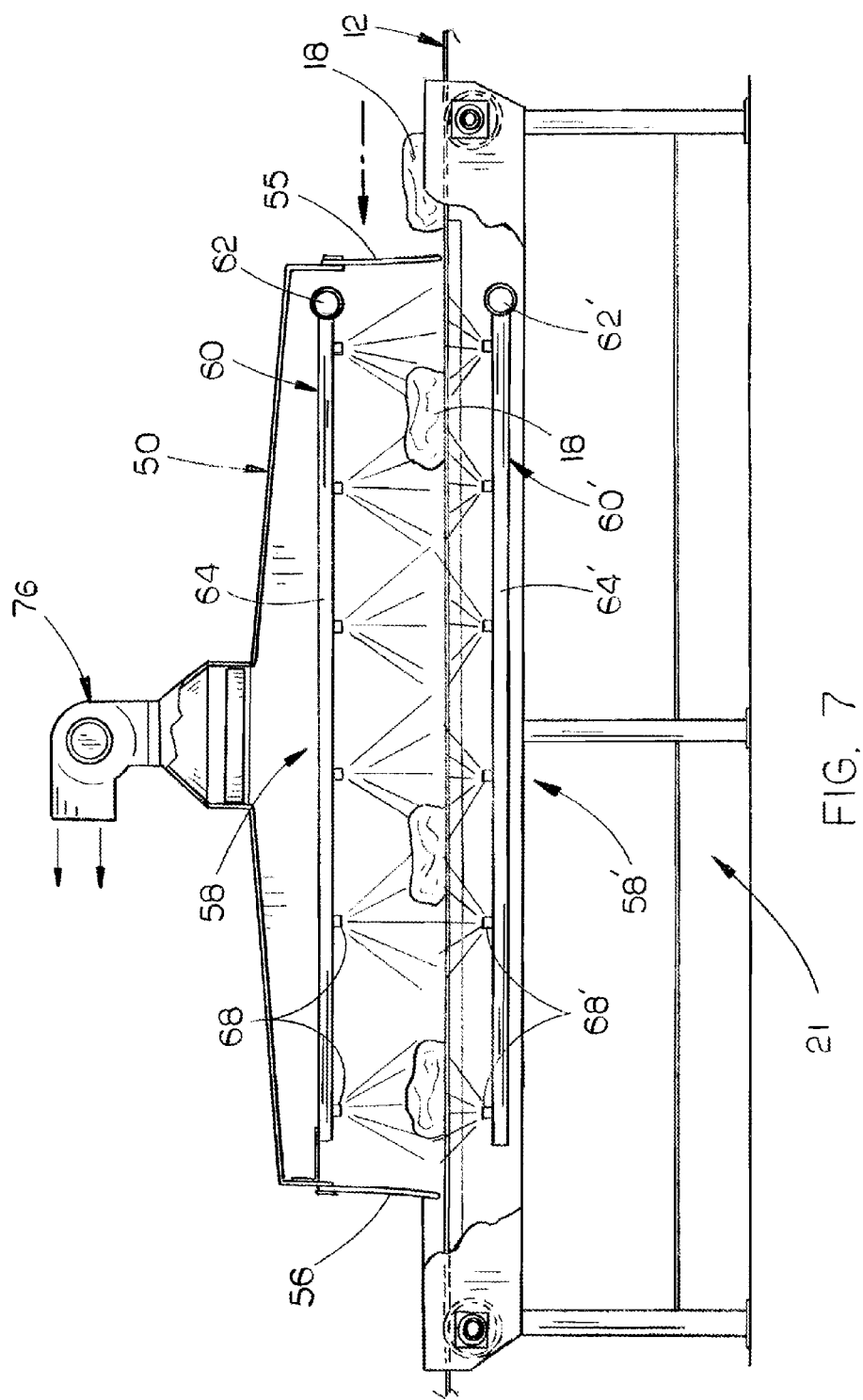
FIG. 7 is another partial sectional view of the second housing and the oxidizing system therein.

The numeral 50 refers to a second housing or enclosure which is supported upon the support frame 21 and which has an infeed end 52 and a discharge end 54. Although the drawings illustrate that housing 50 is positioned downstream of housing 22, housing 50 could be positioned upstream of housing 22. A plurality of flexible closure flaps 55 are provided at the infeed end 52 of housing 50 and a plurality of flexible closure flaps 56 are provided at the discharge end 54 of housing 50 as seen in FIG. 7. The numeral 58 refers to an oxidation unit or system including an upper manifold 60 which includes a transversely extending upper conduit or pipe 62 having a pair of longitudinally extending conduits or pipes 64 and 66 in fluid communication therewith. Spray nozzles 68 are provided on conduit 64 and spray nozzles 70 are provided on the conduit 66. Conduit 62 is in fluid communication with a pump 72 which is in communication with a source of an ozone/water mixture or an ozone/air mixture which is sprayed onto the food product 18 as it passes through housing 50. The oxidation unit or system 58 also includes a lower manifold 60' which includes a transversely extending lower conduit or pipe 62' having a pair of longitudinally extending conduits or pipes 64' and 66' in fluid communication therewith. As seen in FIG. 6, manifold 60', conduit 62', conduits 64' and 66' are located below the conveyor 12. Spray nozzles 68' are provided on conduit 64' and spray nozzles 70' are provided on the conduit 66'. Conduit 62' is in fluid communication with the pump 72 which is in communication with the source of an ozone/water mixture or the ozone/air mixture. Preferably, a catch tray 74 is provided below the conveyor 12 to catch the ozone/water or ozone from the ozone/air mixture being sprayed onto the food product. The fluid collected in the tray 74 may be recycled or may be permitted to pass through a discharge drain. The numeral 76 refers to an exhaust blower or fan which is positioned on the upper side of housing 50 as seen in FIG. 6.

In operation, the food product, which may be pork, beef, poultry, sea food or other food products, is placed on the infeed end of the conveyor 12. The food product 18 is conveyed through the housing 22 wherein the UV lamps or tubes 42 direct UV rays onto the top portion of the food product and onto the sides of the food product due to the reflection hood positioned thereabove. The underside of the food product is subjected to UV rays by the lower tubes 42. The UV rays reduce the amount of bacteria on the food product as the food product moves through the housing 22. The flaps 32, 34, 38 and 36 prevent the UV rays within the housing 22 from coming into contact with personnel outside the housing 22. After the food product 18 has been discharged from the housing 22, the food product is introduced into the infeed end of the housing 50. As the food product 18 passes through the housing 50, the ozone/water mixture or the ozone/air mixture is sprayed onto the food product 18 by the manifolds 60 and 60' to further reduce the amount of bacteria on the surface of the food product. In addition to reducing the amount of bacteria on the product, the ozone/water mixture or the ozone/air mixture assists in cleaning conveyor 12 and reducing the amount of bacteria on conveyor 12 as it passes through the housing 50. The flaps 55 and 56 contain the oxidizing agent within the housing 50.

Although the drawings illustrate that the food product is first subjected to UV rays and then subjected to an oxidizing agent, the food product could be first subjected to the oxidizing agent and then subjected to the UV rays.

Thus it can be seen that a novel method and means has been provided for reducing the amount of bacteria on a food product which extends the shelf life thereof through the use of UV rays and then ozone. The substantial reduction of bacteria on the food product 18 as it passes through the UV ray unit and the ozone unit will substantially extend the shelf life of the food product.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. A method of extending the shelf life of a food product, comprising the steps of: providing a horizontally disposed and elongated inlet chamber with an open inlet end and an open discharge end with the open inlet end thereof having a plurality of first flexible closure flaps and with the open discharge end thereof having a plurality of second flexible closure flaps; providing a horizontally disposed first housing having an open inlet end and an open discharge end with said open inlet end thereof being in communication with said discharge end of said inlet chamber; providing a horizontally disposed and elongated discharge chamber with an open inlet end and an open discharge end with the open inlet end thereof having a plurality of third flexible closure flaps and with the open discharge end of the discharge chamber having a plurality of fourth flexible closure flaps and with the open inlet end of the discharge chamber being in communication with the discharge end of the first housing; providing a horizontally disposed second housing having an inlet end with a plurality of fifth flexible closure flaps and with a discharge end with a plurality of sixth flexible closure flaps; providing an elongated and horizontally disposed conveyor which extends through said inlet end of said inlet chamber, through said inlet chamber, through said discharge end of said inlet chamber, through said inlet end of said first housing, through said first housing, through said discharge end of said first housing, through said inlet end of said second housing, through said second housing and through said discharge end of said second housing; placing a food product on the conveyor outwardly of said inlet end of said inlet chamber; operating the conveyor to move the food product through said first closure flaps, through said inlet chamber, through said second closure flaps, and into said first housing; subjecting substantially all portions of the food product in said first housing to UV germicidal irradiation as the conveyor moves the food product through said first housing; passing the food product through said third closure flaps, through said discharge chamber and through said fourth closure flaps with the first, second, third and fourth closure flaps to prevent the UV rays in said first housing from passing outwardly from the inlet and discharge ends thereof; passing the irradiated food product through said fifth closure flaps into said second housing; and subjecting substantially all exterior surfaces of the irradiated food product to an oxidizing agent with the fifth and sixth closure flaps preventing the oxidizing agent from passing outwardly from the inlet and discharge ends of said second housing.

2. The method of claim 1 wherein cooling air is introduced into said first housing.

3. The method of claim 1 wherein said oxidizing agent is ozone.

4. The method of claim 1 wherein said oxidizing agent is an ozone and water mixture.

5. The method of claim 1 wherein said oxidizing agent is an ozone and air mixture.

6. The method of claim 1 wherein said conveyor is also subjected to said oxidizing agent in said second housing to sanitize the conveyor.

\* \* \* \* \*